UNITED STATES PATENT OFFICE.

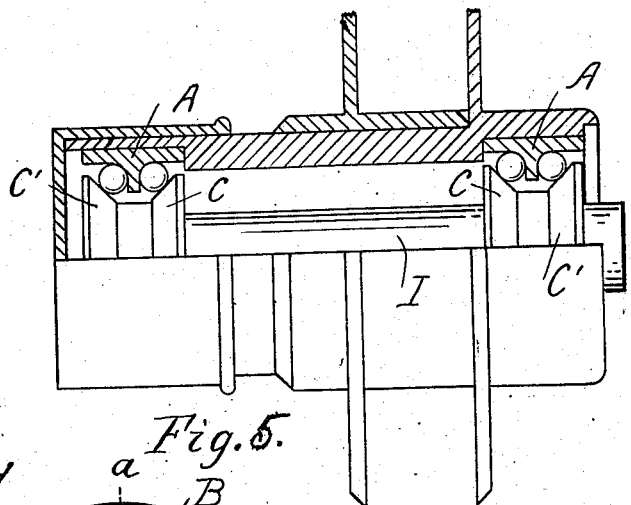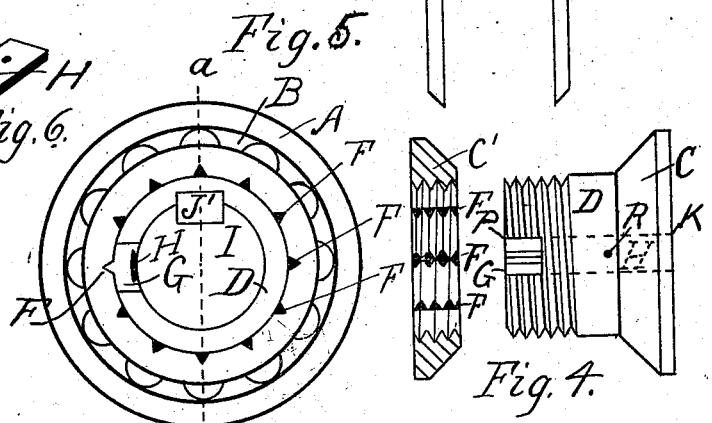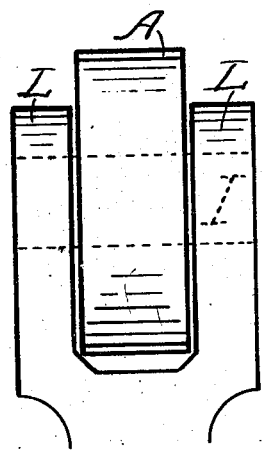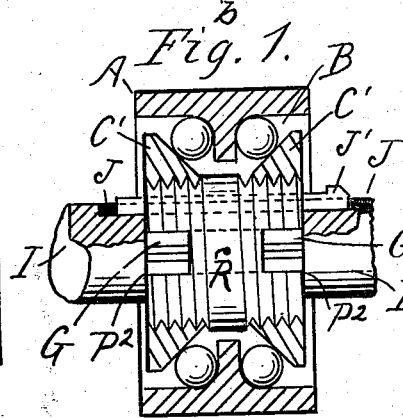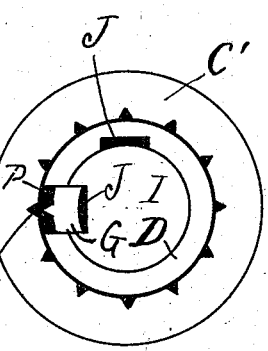

GEORGE W. B. McELHONE, OF BINGHAMTON, NEW YORK.

BALL-BEARING.

1,000,685.   Specification of Letters Patent.   Patented Aug. 15, 1911.

Application filed December 4, 1908. Serial No. 465,949.

*To all whom it may concern:*

Be it known that I, GEORGE W. B. McEL-HONE, a citizen of the United States, and a resident of the city of Binghamton, in the county of Broome and State of New York, have invented certain new and useful Improvements in Ball-Bearings, of which the following is a specification.

My invention relates to improvements in ball bearings and more particularly to revoluble ball bearing rollers or wheels and housings designed for revoluble shafting or spindles.

The object of my invention is the production of a ball bearing roller, wheel or housing wherein adjustment of the races may readily be made and maintained within the parts comprising said roller, wheel, or housing, and the shaft or axle thereof, said means of adjustment thereby being integral therewith and not necessarily extending beyond the width of the roller, hub of wheel, or housing, thus permitting more compact construction of the bearing and the means for securing and maintaining adjustment thereto than is possible in constructions of like character employing other means of adjustment now in use; to render the same capable of being inexpensively constructed and adapted to be adjusted with facility and precision, and capable of being applied where the application of ball bearing rollers, wheels, or housings provided with common means of adjustment of races would be prohibitive on account of the space in addition to the width of said roller, hub of wheel, or housing their means of adjustment occupies.

With these and other objects in view, my invention consists of certain novel features of construction and arrangements of parts, all of which will now be fully described and finally embraced in the claims.

Referring to the drawings, accompanying and forming a part of this specification, in which like letters and numerals of reference denote the same parts throughout the several views: Figure 1 is an end view of my invention. Fig. 2 is a sectional view, taken on the line $a$—$b$ of Fig. 1. Fig. 3 is an end view, showing one of the cones, the sleeve and the shaft. Fig. 4 shows the sleeve and cones, and the engaging portion of a gib held within the sleeve. Fig. 5 shows the application of my invention within a hub or journal. Fig. 6 is a perspective view of a gib. Fig. 7 shows my invention used as a cam roller.

The part A, shown in the various views, is made of suitable material, in each end of which are formed the cups B, adapted to, in conjunction with cones arranged on a suitable sleeve, form races for balls in the usual manner. Said part A may comprise a case so constructed that the cups B may be fitted therein. The periphery of case A may be the outer surface of a roller of small diameter, or one or more of the bearings may be fitted within a hub, as shown at Fig. 5, provided with any common means for securing spokes or radial arms thereto, where the bearing is to be used in the construction of rollers or wheels of larger diameter. The central portion of case A, having contained therein the cups B, is provided with an opening of sufficient size to allow a sleeve D to pass within said part.

The reference letter D indicates a sleeve of such diameter that, when it is inserted within the part A, said part A may be rotated around said sleeve without bearing thereon. The sleeve is ordinarily designed so that it may be mounted upon a shaft or pin I. As shown in Fig. 4, said sleeve is so shaped that cone C forms a part thereof, said sleeve and cone being made of one piece. When the cone C forms a part of the sleeve, or is fixedly secured thereto, the other end of the sleeve is provided with screw threads, in order that the adjustable cone $C^1$ may be screwed thereupon and thereby be capable of adjustment. A slot P, at the threaded end of said sleeve, is adapted to contain a gib G so as to permit said gib to engage with an engaging portion provided within the adjustable cone $C^1$.

When advantage is to be gained by such form of construction, as shown at Fig. 2, the sleeve D may be threaded at both ends, and each cone be adapted to be screwed thereon, in which case both ends of the sleeve D may be slotted, as at $P^2$, to contain gibs designed to act upon each of the adjustable cones for the purpose of maintaining the adjustment as hereinbefore described. The keyway J may be formed within the sleeve, if occasion demands it. A keyway K, in certain forms of construction of my device, contains a spring H, or other holding member, for the gib G, in order to maintain said gib within the slot P. The adjustable cone $C^1$ is adapted to be screwed on to the sleeve D, and is of such form that it will, in conjunction with cone C, coöperate with the cups to form races for balls. Said adjustable cone contains longitudinal grooves F, or their equivalent, so formed that the engaging portion of gib G may be held into engagement therewith and thus prevent rotation of said adjustable cone, for the purpose of maintaining the adjustment of said cone and render the same to be capable of readjustment when required. The races formed by the cups and cones have balls interposed therein in the usual manner.

The gib G, or similar device, adapted to engage with the grooves F of adjustable cone $C^1$, is secured to or within the sleeve, or it may be contained by the shaft or pin I. In the form of construction shown in Figs. 1, 2, 3 and 4, the gib G is held in position within the sleeve D by means of the spring H, which spring is secured within a keyway K in said sleeve in such manner that a portion of said gib will engage with the grooves F of the adjustable cone $C^1$, when it is required to thus engage them, and further to permit the engaging portion of gib G to become disengaged from said longitudinal grooves by deflecting spring H to which the said gib is secured or forms a part. In Figs. 2 and 4, spring H is secured within the sleeve D by means of a rivet R.

A pin or shaft I, adapted to pass through the sleeve D, is provided for the purpose of forming a fastening for the roller or wheel, and the said pin or shaft also serves to securely hold the engaging portion of the gib G into engagement with one of the longitudinal slots of adjustable cone $C^1$, and thus prevent rotation of cone $C^1$, when said pin or shaft is in proper position within said sleeve. Said pin or shaft may be provided with a groove or keyway J, as shown at Figs. 2 and 3, in such manner that a partial revolution or partial withdrawal of said pin or shaft, or the sleeve mounted thereon, will cause said keyway J to come into such position with relation to the gib G that the engaging portion of said gib may be thrown out of engagement with the longitudinal grooves F of adjustable cone $C^1$, while the said sleeve D is still held on the shaft, and thereby permit adjustment of cone $C^1$ without removing said sleeve or the roller or wheel mounted thereon from its pin or shaft, as shown in Fig. 3. In cases where the bearing is to be used in a cam roller or similar device, which may readily be removed for adjustment, said pin I may be of solid material, without the slot J, in which case it will be necessary to remove said pin I in order to allow the gib to become disengaged from grooves F of adjustable cone $C^1$ to permit its adjustment. Wherever it is necessary to secure lateral adjustment of each end of said sleeve so that both cones C and $C^1$ may be screwed thereon, to adapt the sleeve D to be fitted at each end with a gib G, or $G^1$, and also to provide both cones C and $C^1$ with threads and the longitudinal grooves F, as previously, and for the purpose shown in the case of cone $C^1$. Two or more of the bearings of like or different diameters may be inserted in an outer shell, thereby distributing the load equally over a greater area, as shown in Fig. 5.

In constructions where two or more units are employed in a bearing, lateral adjustment of the cones of each unit, in relation to its balls and cups within the case, may be obtained by so fitting the hole of the sleeve D, adapted to contain the shaft, that said sleeve carrying the cones C and $C^1$ will be permitted to slide endwise on either a solid or splined pin or shaft, and thus compensate for unequal wear of either of the races or the balls contained therein, whenever it becomes necessary to change the adjustment of the adjustable cone or cones.

In the forms of construction above shown, the cups and case containing them are adapted to revolve around the sleeve D, cones C and $C^1$ and the pin or shaft within said sleeve, but the case A with its cups B secured within or forming a part thereof may be fixedly secured within a housing or hanger where it is desired to construct a ball bearing hanger or housing for revolving shafting, in a similar manner as shown at Fig. 5, in which case the shafting may be secured within the sleeve and made to revolve with said sleeve, while the case and the cups contained therein remain fixed.

In case of my invention being applied to a cam roller or similar device held between lugs L and secured by pin I, as shown in Fig. 7, when it becomes necessary to change the adjustment of adjustable cone or cones to compensate for wear, said pin I may be withdrawn and the roller removed. The gib not now being held into engagement with any of the longitudinal grooves of adjustable cone by said pin, it may be disengaged therefrom, when the said cone may be turned upon the threads of the sleeve in such manner as to secure proper adjustment of the races, after which the gib may again be engaged with a coinciding longitudinal groove. The roller is then returned to its place and secured by the pin I, which forms its axis, and also serves to hold an engaging portion of the said gib into engagement with the coinciding longitudinal slots F of the adjustable cone $C^1$ and prevent the rotation of said cone $C^1$ upon the sleeve D.

Where it is not convenient to remove the bearing in order to make adjustment, and where the means for fastening the roller or wheel is similar to that shown in Figs. 2 being provided with keyways J, J, as hereinbefore described, after the key J¹ is withdrawn, the sleeve D may be revolved on said shaft to bring the gib G into such position that it may be depressed into the keyway J of the shaft sufficient to allow it to be disengaged from longitudinal grooves of the adjustable cone C¹, as shown in Fig. 3, when the said adjustable cone may be rotated upon the threads of the sleeve to make the adjustment, after which said sleeve is given a partial turn upon the shaft or pin, in order that said shaft or pin will hold the engaging portion of the gib G into engagement with the longitudinal slot, and thus maintain the adjustment. By inserting a key J¹ into the keyway J of the sleeve and the keyway J of the shaft, shown in Figs. 1, 2 and 3, the sleeve will be maintained in a fixed position on the shaft I but the gib G may be pressed back against the action of the spring H and be disengaged from the groove F of the cone C and thus permit the cone to be rotated for adjustment of the races.

Various modifications may be made in the construction of my device without departing from the spirit of my invention.

Having thus described my invention, what I claim as new and desire to secure by Letters Patent is—

1. In a device of the class described, a shaft, a casing, a sleeve on said shaft, the exterior of said sleeve being screw threaded, adjustable cones provided with interrupted screw threads, said cones being carried by said sleeve, and spring pressed means coöperating with the interruptions in the screw threads to maintain said adjustable cones in any definite adjusted position, said spring pressed means being definitely held in normal relationship by means of said shaft.

2. In a device of the class described, a shaft, a sleeve, a casing, said sleeve being keyed to said shaft, the exterior of said sleeve being screw threaded, cones adapted to screw on the ends of said sleeve, the screw threaded portion of said cones being provided with longitudinal grooves, spring pressed keys secured to said sleeve and V-shaped ribs secured on said keys to engage the grooves on said cones, the thickness of said spring pressed keys being substantially that of said sleeve and the construction and arrangement of parts being such that the V-shaped ribs on said keys are prevented from disengagement with said cones because of said shaft.

3. In a device of the class described, a shaft, a sleeve, a casing, said sleeve being keyed to said shaft, the exterior of said sleeve being screw threaded, cones screw threaded to engage the threads on said sleeve and spring pressed keys adapted to engage indentations in the screw threaded portion of said cones, said spring pressed keys being of substantially the same thickness as the sleeve and being adapted to coöperate with the shaft in order to prevent the spring pressed keys from accidentally leaving the indentations in the cones when the shaft is keyed in position.

4. In a device of the class described, a shaft, a sleeve, a casing, said sleeve being mounted upon said shaft, the exterior of said sleeve being screw threaded, screw threaded cones adapted to screw on either end of said sleeve said cones being provided with longitudinal grooves, flat spring members secured to said sleeve, projections carried by said spring members, said projections terminating in V-shaped dogs adapted to engage the grooves in said cones, the V-shaped dogs being prevented from leaving said cones by means of said shaft when the parts are in normal position.

5. A roller bearing comprising a sleeve, a shaft adapted to be retained within said sleeve, a cone member carried by said sleeve, longitudinal grooves in said cone member, and means carried by said sleeve adapted to engage said longitudinal grooves, said means coöperating with said shaft in such manner that said means is prevented from being disengaged from said longitudinal grooves when the shaft is in normal relation.

6. A roller bearing comprising a sleeve having an opening therein, a cone adjustably mounted upon said sleeve, means carried by said sleeve and passing through said opening, said means being adapted when in normal position to lock said cone in a predetermined position of adjustment, a shaft adapted to coöperate with said means to hold said means in normal position, said shaft being provided with a key-way, substantially as described.

7. A roller bearing comprising a sleeve, a shaft adapted to be maintained within said sleeve, a cone member adjustably mounted on said sleeve and locking means carried by said sleeve whereby said cone member is adapted to be locked in a predetermined position, said locking means being mounted against longitudinal movement in said sleeve, and adapted to be positively locked in engagement with said sleeve when said shaft is in normal position.

8. A roller bearing comprising a sleeve member, a cone adjustably mounted upon said sleeve, a shaft within said sleeve, said cone being provided on its interior surface with longitudinal grooves, and spring pressed means carried by said sleeve and adapted to coöperate with said longitudinal grooves in said cone, said spring pressed means having a portion thereof substantially the same thickness as said sleeve, and adapted to coöperate with said shaft when said shaft is in normal position, in such manner as to positively lock said spring pressed means in engagement in one of said longitudinal grooves.

9. A roller bearing comprising a sleeve, a cone member adjustably mounted on said sleeve, longitudinal grooves in said cone member, a shaft adapted to be retained within said sleeve, spring pressed means carried by said sleeve and adapted to have locking engagement with said longitudinal grooves, said spring pressed means being of such a thickness as to be fixedly locked in engagement with said longitudinal grooves when said shaft is in normal position.

10. A roller bearing comprising a sleeve member, a shaft adapted to be retained within said sleeve member, a cone member carried by said sleeve, locking means fixedly attached to said sleeve, spring means for normally pressing said locking means in engagement with said cone, said shaft being provided with an opening constructed in such manner as to permit said locking means to be disengaged from said cone when said opening is positioned beneath said locking means, said locking means being formed of a thickness sufficiently great to prevent said locking means from being disengaged from said cone member when said shaft is in normal position.

GEORGE W. B. McELHONE.

Witnesses:
CHESTER R. STILES,
JOHN F. FREEMAN.

---

Copies of this patent may be obtained for five cents each, by addressing the "Commissioner of Patents, Washington, D. C."